United States Patent [19]

Noro et al.

[11] Patent Number: 5,699,249
[45] Date of Patent: Dec. 16, 1997

[54] ELECTRIC POWER STEERING APPARATUS HAVING A PHASE COMPENSATION SECTION

[75] Inventors: Yoshiki Noro; Shinji Hironaka; Yoshinobu Mukai, all of Saitama-ken, Japan

[73] Assignee: Honda Giken Kogyo Kabushiki Kaisha, Tokyo, Japan

[21] Appl. No.: 531,863

[22] Filed: Sep. 21, 1995

[30]  Foreign Application Priority Data

Sep. 21, 1994 [JP] Japan .................................. 6-226739

[51] Int. Cl.[6] .................................................. B62D 5/04
[52] U.S. Cl. ............................ 364/424.052; 180/79.1; 180/142
[58] Field of Search ................ 364/424.051, 424.052, 364/424.053, 424.054; 180/79.1, 141, 142, 143

[56] References Cited

U.S. PATENT DOCUMENTS

| | | | |
|---|---|---|---|
| 5,239,490 | 8/1993 | Masaki et al. | 364/424.051 X |
| 5,259,473 | 11/1993 | Nishimoto | 364/424.053 X |
| 5,483,446 | 1/1996 | Momose et al. | 364/423.098 |
| 5,566,072 | 10/1996 | Momose et al. | 364/436 |
| 5,600,559 | 2/1997 | Nishimoto et al. | 364/424.051 |

FOREIGN PATENT DOCUMENTS 3-118173  12/1991  Japan .

*Primary Examiner*—Collin W. Park
*Attorney, Agent, or Firm*—Armstrong, Westerman, Hattori, McLeland & Naughton

[57] ABSTRACT

An electric power steering apparatus provides a steering assist of an electric motor directly to a vehicle steering system so as to reduce necessary steering power to be applied by a driver, and it is provided with a control unit including a phase compensation section implemented by software. The gain and phase of a steering torque signal from a steering torque sensor can be accurately set which correspond to the running and steering states of the vehicle, on the basis of a vehicle velocity signal from a vehicle velocity sensor. Thus, the gain in a high vehicle velocity condition and in such a frequency range outside the steering region can be controlled to substantially decrease so as to avoid parasitic oscillation and hence prevent the occurrence of magnetostrictive sound and hunting due to the parasitic oscillation. Accordingly, optimum steering feel can be achieved which corresponds to the states of the vehicle.

3 Claims, 6 Drawing Sheets

ELECTRIC POWER STEERING APPARATUS HAVING A PHASE COMPENSATION SECTION

BACKGROUND OF THE INVENTION

1. Field of the Invention

The present invention relates generally to electric power steering which provides a steering assist of an electric motor directly to a vehicle steering system so as to reduce necessary steering power to be applied by a driver, and more particularly to an electric power steering apparatus which is capable of preventing undesirable magnetostrictive sound and "hunting" that would result from parasitic oscillation in a vehicle steering system.

2. Description of the Related Art

Electric power steering apparatuses for use with automotive vehicles are known in which, as typically disclosed by the same applicant in Japanese Utility Model Laid-open Publication No. HEI 3-118173, a phase compensation circuit is provided between a steering torque sensor and a controller unit to correct or compensate the phase of a steering torque signal outputted from the torque sensor, and the constants in the phase compensation circuit are change on the basis of a vehicle velocity signal outputted from a vehicle velocity sensor. With this constant changed, when the vehicle is running at a relatively low velocity, a sufficient steering assist is applied to the steering system, and when the vehicle is running at a relatively high velocity, the response of the steering assist to be applied to the steering system is increased so as to improve the steering feeling.

The phase compensation circuit employed in the prior art electric power steering apparatuses generally comprises first-order phase delaying and advancing circuits formed of resistors (R) and capacitors (C).

The arrangement and operation of such a prior art electric power steering apparatus is outlined below with reference to FIGS. 5 to 7, of which FIG. 5 shows the overall arrangement of the steering apparatus, FIG. 6 is an operational block diagram of the principal components of the steering apparatus of FIG. 5, and FIG. 7 shows a circuit diagram of the phase compensation section in the steering apparatus.

As shown in FIG. 5, the prior art electric power steering apparatus 1 is provided with a manual steering power generation mechanism 7. This manual steering power generation mechanism 7 includes a steering shaft 3 that is provided integrally with a steering wheel 2 and is also connected, via a connecting shaft having universal joints 4A and 4B on opposite ends thereof, to a pinion 6A of a rack and pinion set 6 provided in a steering gear box 5.

The pinion 6A is in meshing engagement with a toothed rack 8A, and a rack shaft 8 reciprocatively movable by the meshing engagement between the pinion 6A and rack 8A is connected at opposite ends thereof to left and right steerable front wheels 10 via tie rods 9.

Thus, in response to the driver's steering operation of the steering wheel 2, the front wheels 10 are driven to vary the running direction of the vehicle through the rack-and-pinion-based manual steering mechanism.

In order to reduce the amount of steering power that has to be produced by the manual steering power mechanism 7, an electric motor 11 for supplying a steering assist is connected concentrically with the rack shaft 8, and the supplied steering assist is converted, by a ball thread mechanism 12 provided substantially in parallel with the rack 8, into thrust which is applied to the rack shaft 8.

A driving helical gear 11A is provided integrally with the rotor of the motor 11 and in meshing engagement with a driven helical gear 12A provided integrally with one end of a threaded rod of the ball thread mechanism 12. The nut of the ball thread mechanism 12 is connected to the rack shaft 8.

Within the steering gear box 5, there is provided a steering torque sensor 13 for detecting manual steering torque applied to the pinion 6A. A vehicle velocity sensor 13 is also provided for determine the number of rotations of the vehicle wheels or engine so as to detect a vehicle velocity. These sensors 13 and 14 output the detected steering torque and vehicle velocity as a steering torque signal T and a vehicle velocity signal V, respectively, which are supplied to a phase compensation section 17. In turn, the phase compensation section 17 performs phase compensation on the steering torque signal T on the basis of the vehicle velocity signal V and outputs a resultant phase-compensated steering torque signal $T_o$ to the control unit 15.

The steering wheel 2 and steerable front wheels 10 are interconnected mechanically. A motor drive section 16, which may comprise a bridge circuit formed of FETs, generates motor voltage $V_M$ in accordance with motor control voltage $V_M$ (e.g., PWM signal) that is obtained by the control unit 15 processing the phase-compensated steering torque signal $T_o$ supplied from the phase compensation section 17. The motor voltage $V_M$ is applied to the motor 11, so that the motor 11 is PWM-driven to provide a steering assist corresponding to the steering torque (steering torque signal T) resulting from the driver's operation of the steering wheel 2 and vehicle velocity (vehicle velocity signal V).

In FIG. 6, there are shown, as the principal components of the electric power steering apparatus 1, the steering torque sensor 13, vehicle velocity sensor 14, phase compensation section 17, the control unit 15 including a target current setting section 18 and drive control section 19, and the electric motor 11.

The phase compensation section 17 includes phase delaying and advancing circuits and varies the gain G and phase θ of the steering torque signal T output from the steering torque sensor 13 on the basis of the vehicle velocity signal V output from the vehicle velocity sensor 14, in such a manner that satisfactory steering performance is achieved both in a low vehicle velocity condition where a relatively great steering assist (gain G) is required but the steering response (phase θ) carries little importance and in a high vehicle velocity condition where a relatively small steering assist (gain G) is sufficient but a quick steering response (with no delay in phase θ) is required. In this way, proper steering feeling is guaranteed.

Further, in FIG. 7, the phase compensation section 17, which is implemented by hardware, is comprised of the phase delaying circuit having a resistor R1, a capacitor C1 and an FET (Field-Effect Transistor) Q1, and the phase advancing circuit having resistors Ra and Rb, a capacitor Ca and an operational amplifier OP1.

The phase delaying circuit containing the FET Q1 constitutes a variable phase compensator 17A, which controls the drain-source internal resistance (described as resistance Rf although not shown in the figure) of the FET Q1 on the basis of vehicle velocity signal $V_c$. More specifically, when the vehicle velocity $V_c$ is of a great value (i.e., in a high vehicle velocity condition), the compensator 17A increases the value of the internal resistance Rf, whereas when the vehicle velocity VC is of a low value (i.e., in a low vehicle velocity condition), the compensator 17A decreases value of the internal resistance Rf, to thereby adjust the gain G and phase θ.

In general, the respective transfer functions Ha(s) and He(s) of the first-order phase delaying and advancing circuits in the s (Laplace operator) domain may be expressed by the following equation:

[Equation 1]

$Ha(s)=(s*ka+1)/(s*kb+1)$, where $Ka=C1Rf$, and $kb=C1 (R1+Rf)$ $He(s)=(s*k\alpha+k\gamma)/(s*k\alpha+k\beta)$, where $k\alpha=CaRaRb$, $k\beta=Ra+Rb$, and $k\gamma=Rb$ The frequency characteristics of the gain G and phase θ in the phase delaying and advancing circuits can be calculated by transforming Equation 1 into the frequency domain (f) (s=jω).

In a high vehicle velocity condition, by increasing the value of the internal resistance Rf of the FET Q1, the phase delaying circuit is set to be inoperative (i.e., sufficiently increased value of the internal resistance Rf will result in a same result as obtained where no phase delaying circuit is provided), so that no delay in phase θ occurs although gain G is small.

Thus, when the vehicle is running at high velocity, the steering torque signal T from the torque sensor 13 and the steering torque signal $T_o$ from the phase compensation section 17 coincide with each other (gain G and phase θ coincide with each other), with the result that a steering assist can be applied quickly from the electric motor 11 to the steering system in response to the driver's operation of the steering wheel 2.

In a low vehicle velocity condition, by decreasing the value of the internal resistance Rf of the FET Q1, the phase delaying circuit is set to be highly operative, so that gain G can assume a sufficiently great value although the steering torque signal $T_o$ has a delay in phase θ with respect to the steering torque signal T. Thus, a great steering assist can be applied from the electric motor 11 to the steering system in response to the driver's operation of the steering wheel 2.

The delay advancing circuit has fixed constants to assume fixed characteristics irrespective of the vehicle velocity signal $V_c$ and acts to compensate for the phase delay, caused in the phase delaying circuit, by advancing the phase θ.

The phase-compensated steering torque signal $T_o$ is fed to the target current setting section 18 of the control unit 15, which in turn converts the torque signal $T_o$ into a corresponding target current signal $I_{MS}$ on the basis of a preset steering torque ($T_o$)—target current ($I_{MS}$) characteristic table as shown in FIG. 8 and supplies the target current signal $I_{MS}$ to the drive control section 19.

The drive control section 19 converts the target current signal $I_{MS}$ to motor control voltage $V_c$ that comprises a mixture of an on-signal and PWM (Pulse Width Modulation) signal. The motor drive section 16 that may comprise a bridge circuit formed of power FET's is controlled by the motor control voltage $V_o$ to generate motor voltage $V_M$, in response to which the motor 11 is driven to generate a proper steering assist to be applied to the steering system.

However, in the above-mentioned prior art electric power steering apparatus, because the phase compensation circuit is comprised of discrete hardware components such as resistors, capacitors and operational amplifier, the characteristics of gain G and phase θ would become uneven or vary due to uneven performance of the individual circuit components, time varying environmental condition etc., so that a desired steering performance could sometimes not be attained.

In particular, the variable resistor Rf implemented by the FET Q1, although it could provide high accuracy at or around zero (0) and infinity (∞), could not provide accurate resistance values in the intermediate region between zero (0) and infinity (∞).

Further, the gain G and phase θ essentially necessary for desired results must have sufficient margins if the uneven and time varying performance of the individual circuit components are taken into account in designing the apparatus, and in such a case, it is possible that the gain G is reduced in a low vehicle velocity condition and the phase θ is delayed in a high vehicle velocity condition.

Furthermore, in the case where the steering assist applied from the motor 11 to the steering system is fed back to the steering torque sensor and the steering angular velocity (frequency) is increased by this feedback loop, oscillation would occur to cause undesirable sound (magnetostrictive sound) and hunting in control-oriented signals.

SUMMARY OF THE INVENTION

It is therefore an object of the present invention to provide an electric power steering apparatus which is capable of preventing the occurrence of undesirable magnetostrictive sound and hunting due to parasitic oscillation of a vehicle steering system.

To accomplish the above-mentioned object, the present invention provides an electric power steering apparatus which comprises a vehicle velocity sensor for detecting a velocity of a vehicle so as to output a vehicle velocity signal, a steering torque sensor for detecting steering torque applied to a steering system of the vehicle so as to output a steering torque signal, an electric motor for providing a steering assist to the steering system, and a control section including a phase compensation section, the control section controlling the motor on the basis of the steering torque signal supplied from the steering torque sensor via the phase compensation section, and wherein the phase compensation section is implemented by software.

Most preferably, the phase compensation section implemented by software may include a constant changing section for, on the basis of the vehicle velocity signal outputted from the vehicle velocity sensor, changing a gain and phase of the steering torque signal outputted from the steering torque sensor.

The present invention is essentially characterized in that the control section is provided with the phase compensation section implemented by software, so that it is allowed to set accurate gain and phase compensation characteristics that are free of unevenness and time-variation, with the result that a steering assist can be obtained which corresponds precisely to the vehicle's running and steering states.

Further, where the phase compensation section implemented by software includes the constant changing section to change the gain and phase of the steering torque signal from the steering torque sensor on the basis of the vehicle velocity signal from the vehicle velocity sensor, it is allowed to accurately set desired phase compensation characteristics which correspond precisely to the vehicle's running and steering states. By accurately setting desired phase compensation characteristics that are free of unevenness and time-variation and correspond to the vehicle velocity in the above-mentioned manner, it is possible to avoid parasitic oscillation in the steering system and prevent undesirable magnetostrictive sound and hunting that would otherwise result from the parasitic oscillation. As the result, an electric power steering apparatus is achieved which provides optimum steering feeling.

DETAILED DESCRIPTION OF THE PREFERRED EMBODIMENTS

Figure 1:
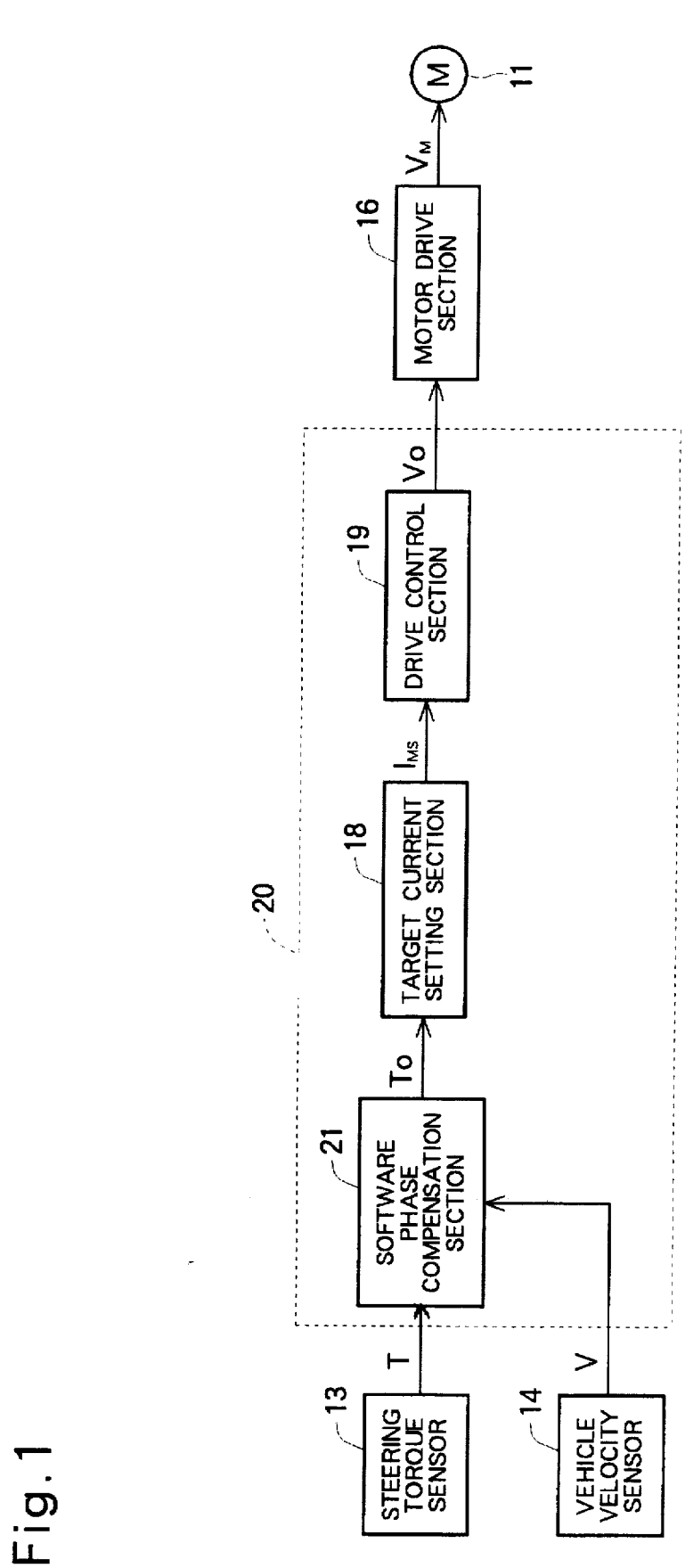
FIG. 1 is a block diagram illustrating the general arrangement of an electric power steering apparatus according to one embodiment of the present invention.
Figure 6:
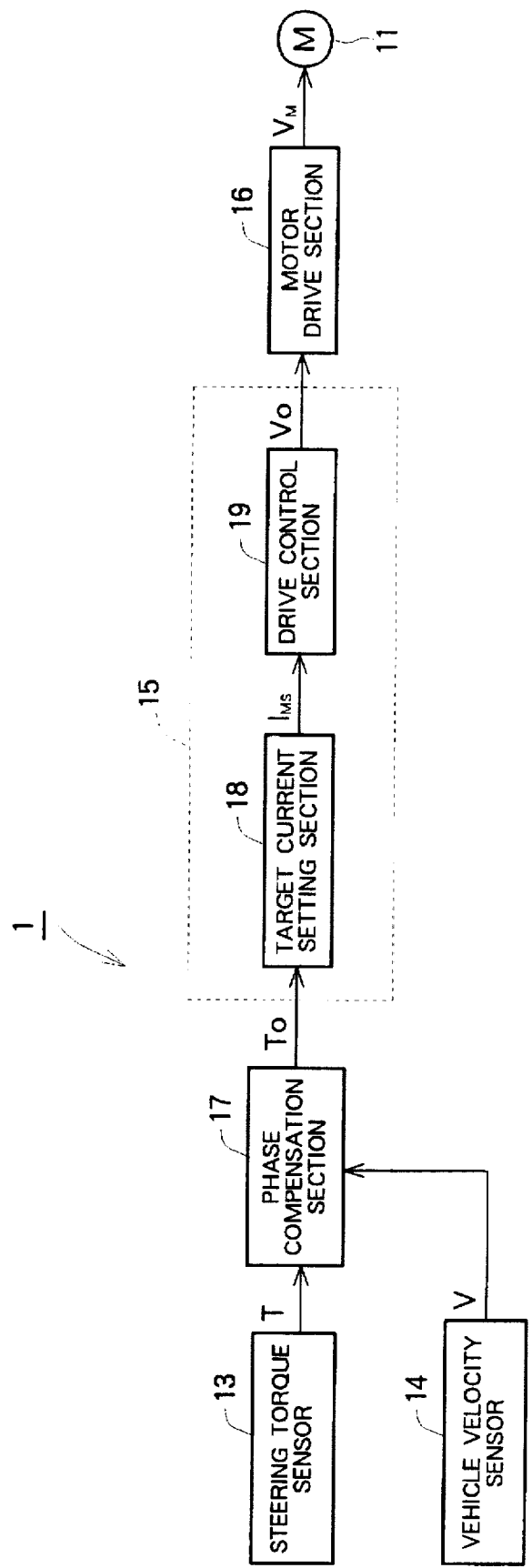
FIG. 6 is an operational block diagram of the principal components of the power steering apparatus of FIG. 5.
Figure 7:
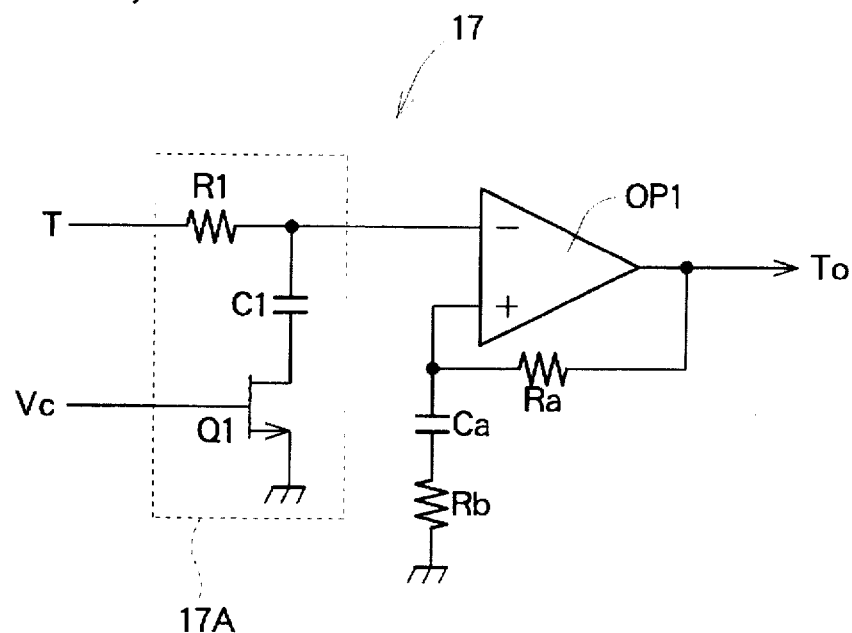
FIG. 7 is a circuit diagram of a phase compensation section employed in the power steering apparatus of FIG. 5.

FIG. 1 is a block diagram illustrating the general arrangement of an electric power steering apparatus according to one embodiment of the present invention, where the same operational blocks as those in FIG. 6 are denoted by same reference numerals.

In FIG. 1, the electric power steering apparatus 1 comprises a steering torque sensor 13, a vehicle velocity sensor 14, a control unit 20, a motor drive section 16 and an electrical motor 11.

The control unit 20 performs various arithmetic operations and other processing using a microprocessor and software programs, and includes a phase compensation section 21 implemented by software (software phase compensation section), a target current setting section 18 and a drive control section 19. The control unit 20 is different from the counterpart of FIG. 6 in that the software phase compensation section 21 is provided in place of the conventional hardware phase compensation section 17.

Analogue steering torque signal T and vehicle velocity signal V output from the steering torque sensor 13 and vehicle velocity sensor 14 are fed to the control unit 20 after having been converted via unillustrated A/D converters into digital steering torque signal T and vehicle velocity signal V.

Figure 2:
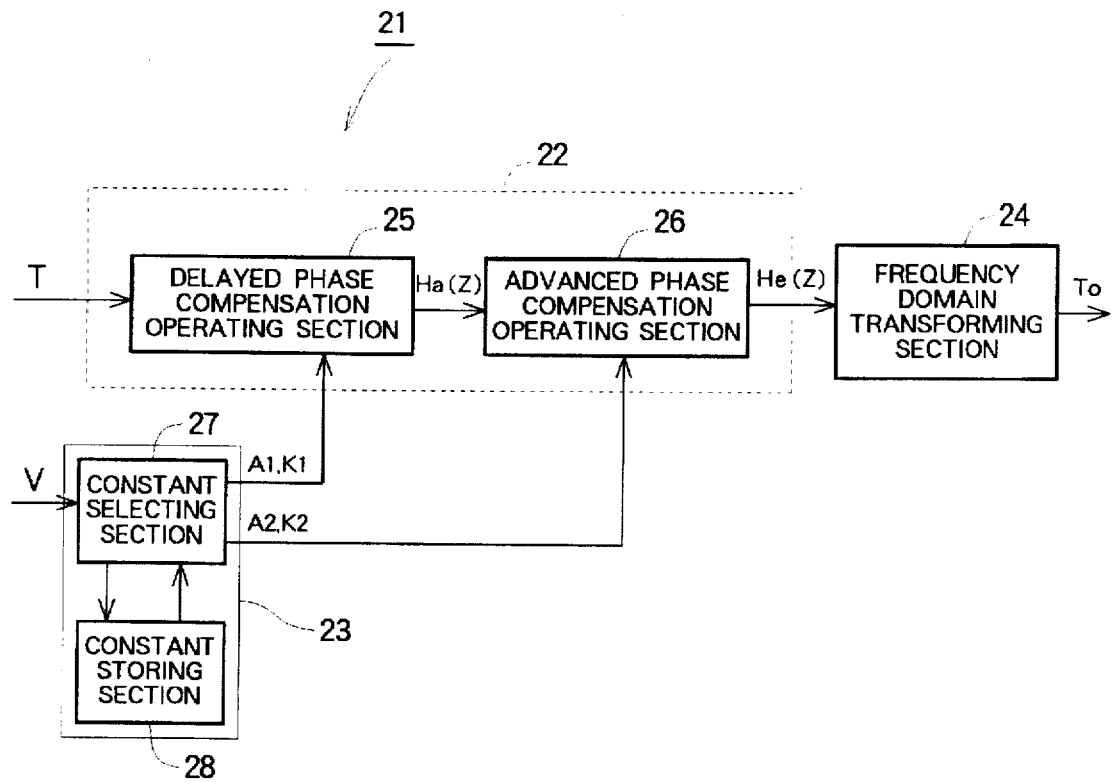
FIG. 2 is a block diagram illustrating principal components of a software phase compensation section employed in the power steering apparatus of FIG. 1.

FIG. 2 is a block diagram of the principal components forming the software phase compensation section 21 in the power steering apparatus of FIG. 1.

As shown, the software phase compensation section 21 includes a phase compensation operating section 22, a constant changing section 23 and a frequency domain transforming section 24. The compensation section 21 computes z-transformed discrete transfer functions Ha(z) and Hb(z), of sampling time ST, for delayed and advanced phase compensation, multiplies the digital steering torque signal T by the computation result so as to calculate a z-domain response output for the sampling time ST, and then transforms the response output into the frequency domain (f) so as to output a phase-compensated steering torque signal $T_o$.

Also, the software phase compensation section 21 selects constants A1, K1 and A2, K2 corresponding to the digital vehicle velocity signal V and controls the constants A1, K1 and A2, K2 so as to vary the respective characteristics of delayed and advanced phase compensation.

As shown in FIG. 2, the phase compensation operating section 22 is comprised of a delayed phase compensation operating section 25 and an advanced delay compensation operating section 26 which correspond to a conventional analog delayed phase compensating circuit and advanced phase compensating circuit. The phase compensation operating section 22 thus arranged computes z-transformed, discrete transfer functions Ha(z) and Hb(z), of sampling time ST, for delayed and advanced phase compensation, multiplies the digital steering torque signal T by the computed transfer functions Ha(z) and Hb(z), and then supplies the multiplication result Ha(z)*Hb(z)*T to the frequency domain transforming section 24.

The computation of the transfer functions Ha(z) and Hb(z) is carried out typically by performing, on the s-domain transfer functions Ha(s) and He(s) calculated by Equation 1, a bilinear transformation as expressed in Equation 2 below for the s-domain to z-domain transformation:

[Equation 2]

$$s=2(z-1)/\{ST(z+1)\},$$

where ST represents sampling time.

By substituting Equation 2 into Equation 1 to arrange coefficients, the transfer functions Ha(z) and H(z) may be expressed as:

[Equation 3]

$$Ha(z)=\{(A1+K1)Z-A1\}/(z-1+K1)$$

$$Hb(z)=\{(A2+K2)Z-A2\}/(z-1+K2),$$

where A1, K1, A2 and K2 are constants.

The constant changing section 23 is comprised of a constant selecting section 27 and a constant storing section 28 which prestores various values of constants A1, K1, A2 and K2 corresponding to various vehicle velocity values V. Thus, upon receipt of a digital vehicle velocity value V, the section 23 selectively retrieves constants A1, K1, A2 and K2 to supply the constants A1 and K1 to the delayed phase compensation operating section 25 and the constants A2 and K2 to the advanced phase compensation operating section 26.

Figure 3:
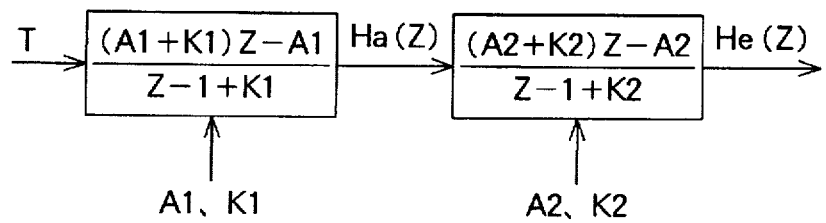
FIG. 3 is a diagram explanatory of the operation of the software phase compensation section.

FIG. 3 is a diagram explanatory of the operation of the software phase compensation section 21. As seen in the figure, the transfer functions Ha(z) and Hb(z), represented in terms of z-domain, for delayed and advanced phase compensation are expressed by the same formula with respect to the z operator, and delayed and advanced phase compensations can be provided by selection of the constants A1 and K1, and A2 and K2, respectively.

The frequency domain transforming section 24 has an inverse z transform operating function and computes a frequency-domain steering torque $T_o$ from the computation result Ha(z)*Hb(z)*T supplied from the phase compensation operating section 22 to thereby output a phase-compensated steering torque $T_o$.

Figure 4A:
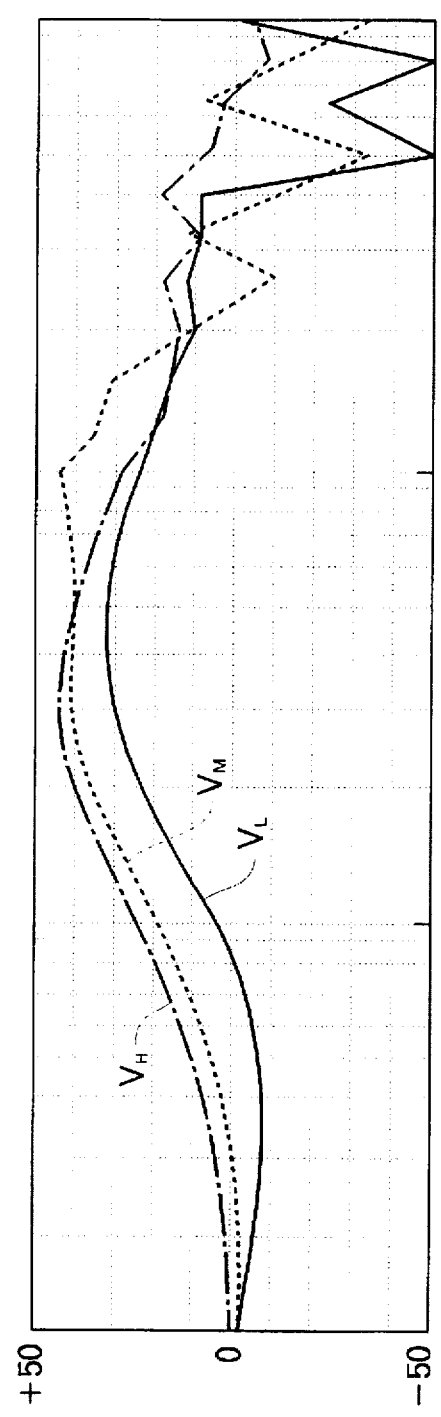
FIGS. 4A and 4B are graphic representations illustrating phase (θ) and gain (G) characteristics of the soft phase compensation section in the power steering apparatus of the invention.
Figure 4B:
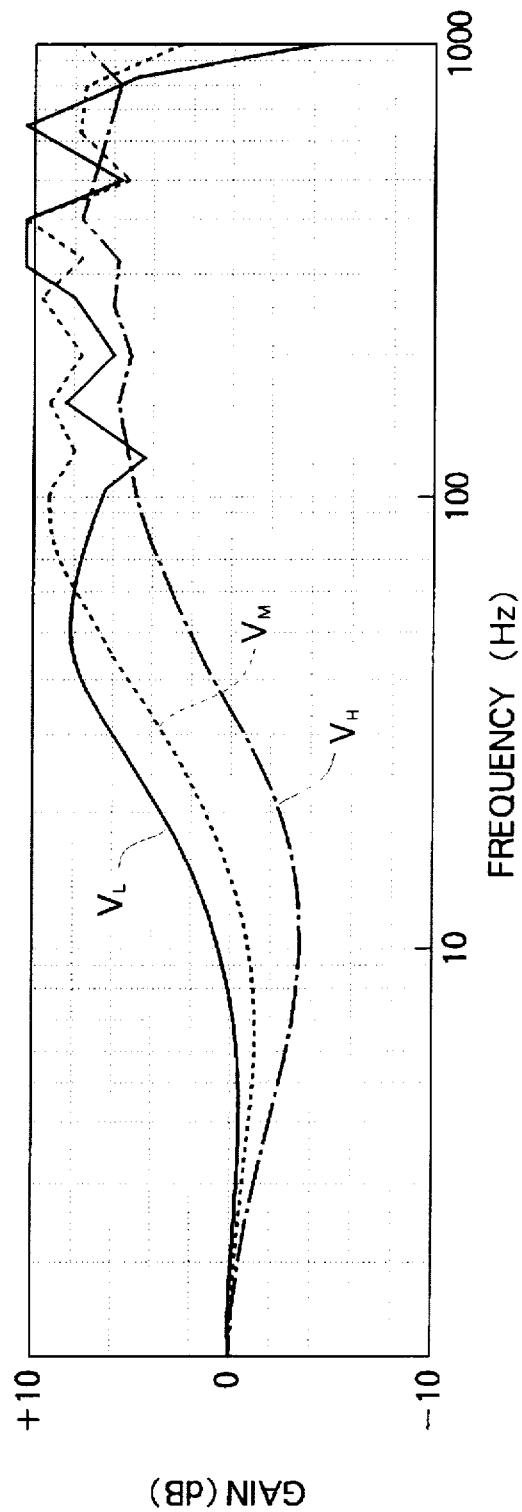
Figure 5:
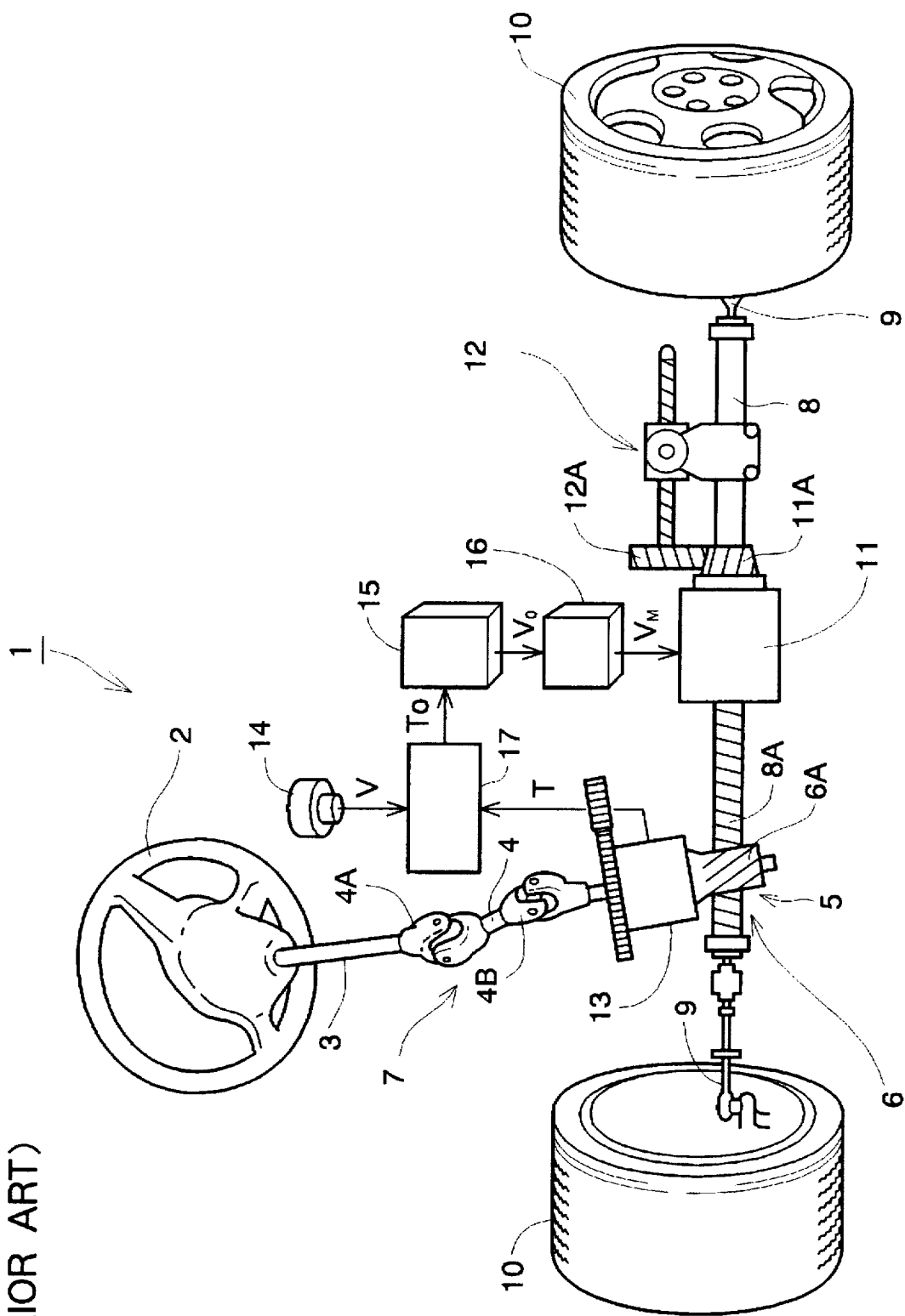
FIG. 5 shows the overall arrangement of a prior art steering apparatus.

FIGS. 4A and 4B are graphic representations illustrating phase (θ) and gain (G) characteristics of the soft phase compensation section in the power steering apparatus of the invention.

In FIGS. 4A and 4B, phase (θ) and gain (G) are expressed in frequency (f) domain (corresponding to the steering angular velocity) by applying an inverse z transform to the computation result Ha(z)*Hb(z)*T of the z-domain transfer functions and using vehicle velocity V (high velocity $V_H$, intermediate velocity $V_M$ and low velocity $V_L$) as parameter.

The characteristic of the parameter (high velocity $V_H$, intermediate velocity $V_M$ and low velocity $V_L$) is finely set on the basis of the constants A1, K1, A2 and K2 selected by the constant selecting section 23.

In a frequency range of 1–10 Hz which is a normal steering region, settings are made for low vehicle velocity $V_L$ such that gain G assumes a relatively great value although there occurs a delay in phase θ.

On the other hand, for intermediate and high vehicle velocities $V_M$ and $V_{VH}$, settings are made such that gain G assumes a relatively small value with no delay in phase θ.

Further, in a frequency range of 20–50 Hz outside the normal steering region, gain G is set to decrease; in particular, gain G for high vehicle velocity $V_{VH}$, is set to assume a much smaller value than those for low and intermediate vehicle velocities $V_L$ and $V_M$.

As shown, in the normal steering region having a frequency range of 1–10 Hz, settings are made such that relatively great gain G is obtained in spite of some delay in phase θ for low vehicle velocity $V_L$ where a great steering assist is required although there is no need for a quick steering response from the driver's steering operation to actual generation by the motor of a steering power assist, and that no delay in phase θ occurs in spite of a small gain G for high vehicle velocity $V_H$ where there is a need for a quick response although no great steering assist is required.

Additional settings are made, in the frequency range of 20–50 Hz off the normal steering region, such that gain G is substantially decreased for high vehicle velocity $V_H$ in order to prevent undesirable magnetostrictive sound and hunting that would result from parasitic oscillation in the vehicle steering system.

Because the software phase compensation section 21 is entirely based on software operations, it is possible to avoid uneven and time-varying performance that is inevitable with discrete hardware components, and a high-accuracy digital filter can be achieved by improving the precision of the reference clock and selecting sampling time ST.

Additionally, because it is not necessary to set a margin in the filter characteristic in allowance for uneven and time-varying performance of discrete hardware components, it is possible to accurately set desired phase compensation characteristics.

Figure 8:
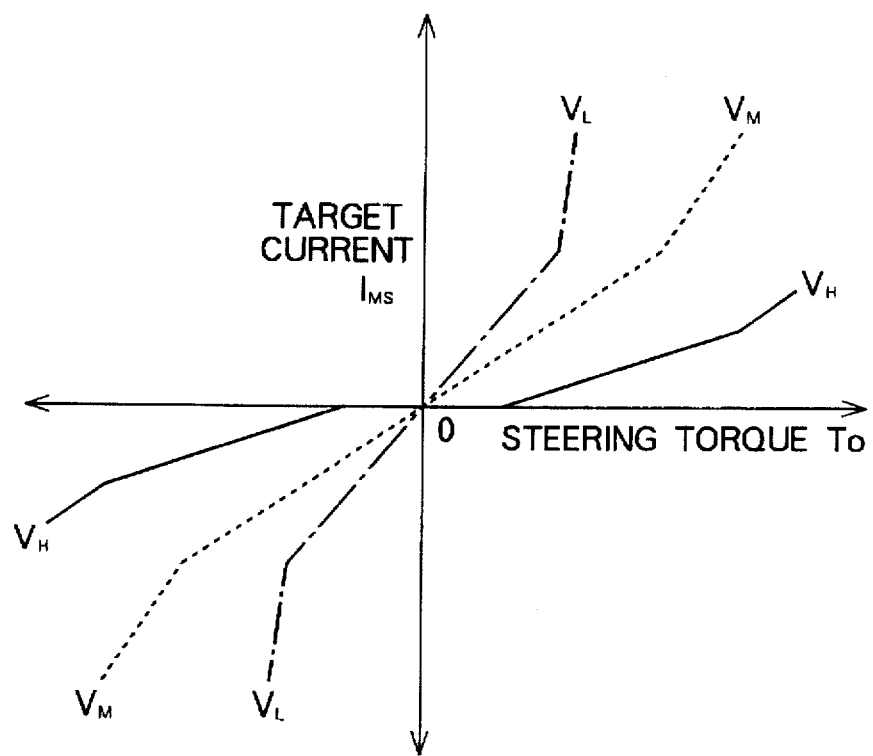
FIG. 8 is a graphic representation of a steering torque ($T_o$)—target current ($I_{MS}$) characteristic.

The software phase compensation section 21 thus arranged supplies a phase-compensated steering torque signal T° to the target current setting section 18 of the control unit 15 of FIG. 1. The target current setting section 18 in turn converts the steering torque signal T° into a target current $I^{MS}$ on the basis of the preset steering torque $(T_o)$—target current $(I_{MS})$ characteristic as shown in FIG. 8 and outputs the target current $I^{MS}$ to the drive control section 19.

The drive control section 19 converts the target current $I^{MS}$ to a voltage signal so as to supply a bridge circuit (formed of four FET's), constituting the motor drive section 16, with motor control voltage V° that is composed of an on- or off-signal and PWM signal. The motor drive section 16 thus drives the motor 11 with motor voltage $V^M$ corresponding to the motor control voltage V°, so that a steering assist corresponding to the steering torque T and vehicle velocity V is applied to the steering system.

As has been described thus far in connection with the preferred embodiment, the present invention is characterized in that the control unit includes the software-implemented phase compensation section, and thus it is allowed to, using arithmetic operations, set accurate gain and phase compensation characteristics that are free of unevenness and time-variation in performance, with the result that an optimum steering assist can be obtained on a phase-compensated steering torque signal.

Further, because the constant changing section is provided to change the gain and phase of the steering torque signal from the steering torque sensor on the basis of the vehicle velocity signal from the vehicle velocity sensor and thus it is allowed to accurately set desired phase compensation characteristics corresponding to the vehicle velocity, a steering assist can be obtained which corresponds precisely to the vehicle's running and steering states.

Accordingly, the software phase compensation section performs such control as to substantially decrease gain G in a high vehicle velocity condition ($V_H$) and frequency range outside the normal steering range, and thus it is possible to avoid parasitic oscillation and prevent the occurrence of undesirable magnetostrictive sound and hunting due to the parasitic oscillation.

By virtue of the above-mentioned features, an electric power steering apparatus is achieved which has superior accuracy and reliability and provides optimum steering feeling.

We claim:

1. An electric power steering apparatus, comprising:
   a steering torque sensor for detecting steering torque applied to a steering system of the vehicle so as to output a steering torque signal;
   an electric motor for providing a steering assist to the steering system; and
   control means including phase compensation means, said control means controlling said motor on the basis of the steering torque signal supplied from said steering torque sensor via said phase compensation means,
   wherein said phase compensation means, implemented by software, sets, based on a vehicle velocity signal, desired phase compensation characteristics that are at least substantially free of unevenness and time variation in said steering torque signal outputted from said steering torque sensor.

2. An electric power steering apparatus as defined in claim 1, further comprising a vehicle velocity sensor for detecting a velocity of a vehicle so as to output a vehicle velocity signal, wherein said phase compensation means implemented by software includes constant changing means for, on the basis of the vehicle velocity signal outputted from said vehicle velocity sensor, changing a gain and phase of the steering torque signal outputted from said steering torque sensor.

3. An electric power steering apparatus as defined in claim 1, wherein said phase compensation means implemented by software includes delayed phase compensation operating means and advanced phase compensation operating means that correspond to a delayed phase compensation circuit and an advanced phase compensation circuit, and said phase compensation means computes z-transformed, discrete transfer functions of sampling time ST.

* * * * *